United States Patent [19]
Delatorre

[11] Patent Number: 5,463,903
[45] Date of Patent: Nov. 7, 1995

[54] TORQUE FLOWMETER

[75] Inventor: Leroy C. Delatorre, Sugar Land, Tex.

[73] Assignee: Panex Corporation, Sugar Land, Tex.

[21] Appl. No.: 191,341

[22] Filed: Jan. 24, 1994

[51] Int. Cl.$^6$ ........................... G01F 1/78
[52] U.S. Cl. ............ 73/861.02; 73/155; 73/861.01
[58] Field of Search ............... 73/155, 861.01, 73/861.02, 861.03, 861.35, 861.36, 861.71, 861.72, 861.75

[56] References Cited

U.S. PATENT DOCUMENTS

| | | | |
|---|---|---|---|
| 720,188 | 2/1903 | Seidner | 73/861.01 |
| 2,483,190 | 9/1949 | Evans | 73/861.72 |
| 2,697,942 | 12/1954 | Engelder | 73/155 |
| 2,706,406 | 4/1955 | Vincent et al. | 73/861.72 |
| 2,975,635 | 3/1961 | Kindler et al. | 73/861.02 |
| 3,241,367 | 3/1966 | Moss et al. | |
| 3,290,937 | 12/1966 | Matthews | 73/861.03 |

FOREIGN PATENT DOCUMENTS 897750  5/1962  United Kingdom ............... 73/861.36

*Primary Examiner*—Richard Chilcot
*Assistant Examiner*—Jewel V. Artis
*Attorney, Agent, or Firm*—Donald H. Fidler

[57] ABSTRACT

A flowmeter particularly for use in determining fluid velocity in oil wells where a torque impeller is connected to a torque force transducer through a torque shaft and a torque coupler. The torque coupler provides for frictionless transfer of torque forces to the torque shaft by torsion bar members. By combining a torque flow meter and a spinner flowmeter means flow can be determined.

19 Claims, 5 Drawing Sheets

TORQUE FLOWMETER

FIELD OF THE INVENTION

This invention relates to flowmeters and more particularly to oil field flowmeters for measuring fluid flow in a well bore.

BACKGROUND OF THE INVENTION

In an oil well environment, downhole fluid flow through the well bore is developed by one or more production zones at levels where fluids in the earth formation enter the well bore under pressure and can include hydrocarbons, water, gas and dissolved gas or a combination of those fluids. The fluid entry to the well bore is through perforations along the length of the casing or liner and, in some wells, the fluid flow can be from one or more production zones at different depths in the well bore.

One of the matters of interest to the operator is the fluid velocity of the fluid flow and the type of fluid, i.e. hydrocarbon, gas, water, or mixture of fluids.

At present, there are a variety of oil field flowmeters in use which utilize spinning impellers where the rotational speed of the impeller is proportional to the velocity of fluid flow. In use, such flowmeters can be utilized to obtain data for production profiles, i.e. which zones produce fluid as well data reflecting a change in a production velocity profile over period of time. Flowmeters are also used for monitoring fluid injection in secondary recovery operations and for determining thief zones, as well as other specialized operations.

A continuous flowmeter is generally utilized for high volume flow and its response is principally affected by viscosity changes of fluids. A packer flowmeter is used in low volume flow applications. Both types of devices require a minimum flow rate or velocity of fluid for operation. The fluid must overcome the friction effects in the flowmeter impeller system.

A packer tool or basket flowmeter permits measurement of total flow but requires a packer device which can obtain a good pack off and principally works better with liquids. The tool must be set and reset for different levels of production.

A continuous flowmeter can make measurements while the tool is moving thereby providing a continuous recording of flow rates. Since only a percentage of the fluid passes through the tool, centering of the tool in the well bore is important to obtain good measurements.

With all rotating impeller flowmeters in addition to minimum velocity to maintain motion of the impeller, the impeller is a mechanically functioning device which is subject to friction effects and is subject to malfunctions. Additionally, impellers because of their high dependence on velocity do not distinguish between the type of fluids i.e. water, gas, hydrocarbon.

For a more detailed discussion of the prior art reference can be made to the article entitled "State of the art simultaneous downhole flow rate and pressure measurement equipment" by G. W. Haws, et.al. in the SPE Production Engineering, November, 1991, pages 427–433.

In an effort to avoid rotating impellers, acoustic flowmeters have been proposed for gas wells. An acoustic flowmeter measures the travel time of acoustic energy between transducers. Reference can be made to the article "Acoustic Flowmeter Field Test Results" by Richard A. McBane in SPE Production Engineering, February, 1991, pages 49–56 for a more detailed description.

Also, other tools can be used in combination with a flowmeter, such as a casing collar locator, a thermometer, a caliper, a manometer or a gradiometer.

THE PRESENT INVENTION

The present invention is embodied in a flowmeter which does not have a rotating impeller and will measure fluid flow from zero velocity to high velocity in both directions. The flowmeter of the present invention uses a non rotating torque impeller system for developing a torque force about a torque axis in response to the force of fluid flow on a torque impeller.

The torque impeller is attached to one end of a longitudinally extending torque shaft by a torque coupler and is coupled at its opposite end to a torque force converter. The torque force convertor develops a response or measurement representative of fluid velocity as a function of torque. The torque coupler, as described herein, provides a rigid mounting of the torque shaft and frictionless torque movement of the torque shaft about the torque axis.

In another aspect of the present invention, the flowmeter of the present invention can be combined with a spinner type flowmeter and obtain an indication of mass flow.

In the torque meter of the present invention, there are no moving parts so that reliability and accuracy are not a function of bearings and there are no bearings requiring maintenance. Flow measurement is continuous down to zero and negative values up to full flow in an opposite direction. Relative measurements can be made in large I.D. casings and there is no flow threshold required for operation. Because there is no spinner, gas bubbles will not affect the calibration and reliability of the sensor. High speed readings are obtained independent of flow rate. Almost instantaneous flow response is obtained because there is no impeller inertia. Changes in fluid density and viscosity have less effect on the measurements.

DESCRIPTION OF THE DRAWINGS

Referring now to the drawings.

DESCRIPTION OF THE INVENTION

Figure 1:
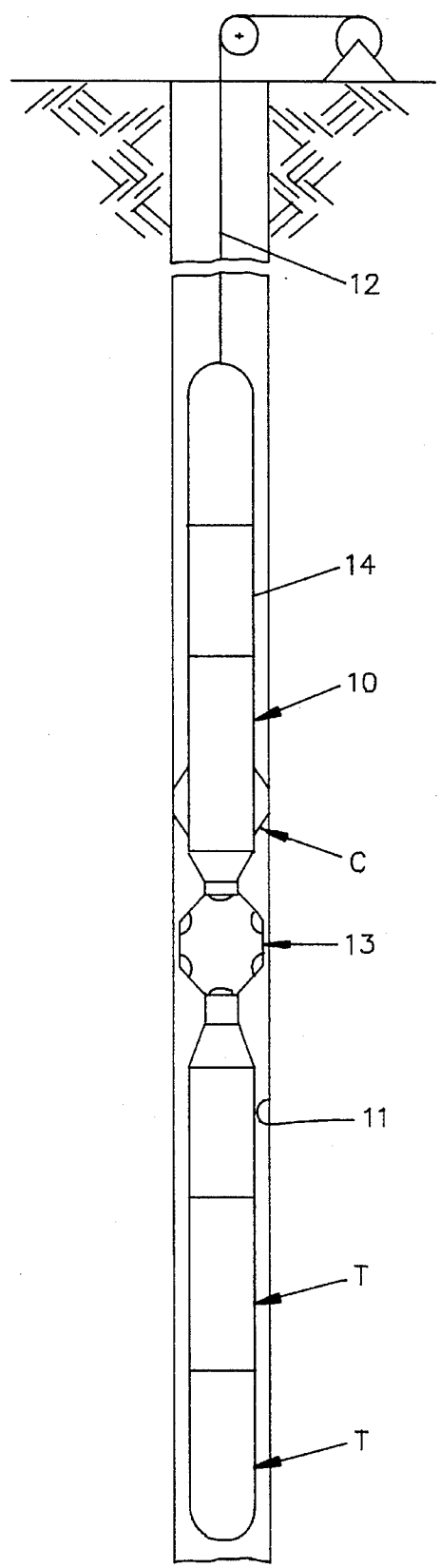
FIG. 1 is a schematic illustration of the tool in which the present invention can be embodied.

Referring now to FIG. 1, an elongated well tool 10 and has a generally cylindrical cross-section for passage through a string of pipe 11 at the end of a wireline 12. The tool includes a flowmeter 13, a casing collar locator 14 and other tools T, as desired. One or two centralizers "C" at spaced apart locations on the tool may also be utilized. The flowmeter 13 can be used to measure fluid flow while either stationary or while moving.

Figure 2:
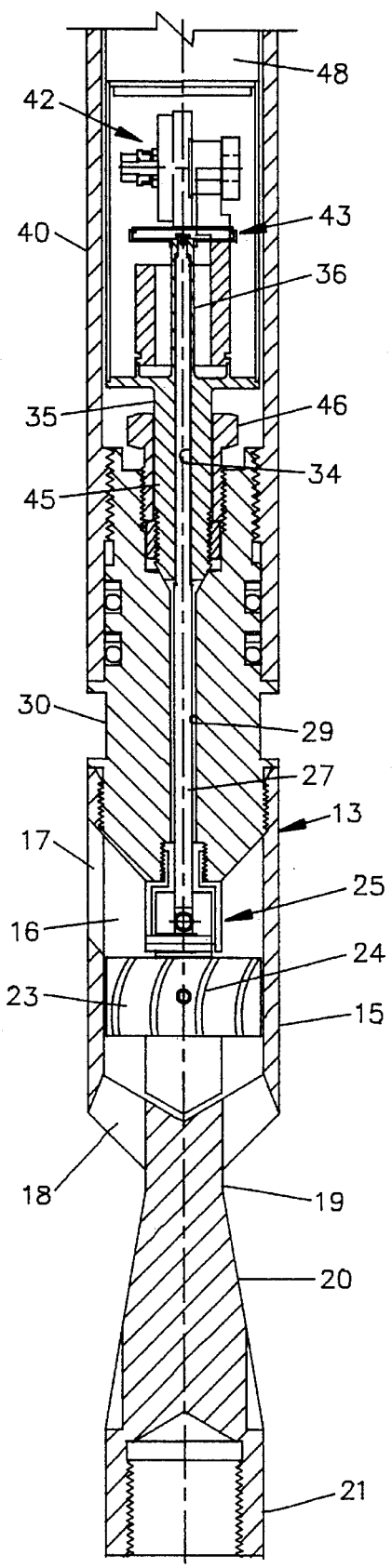
FIG. 2 is a view in longitudinal cross-section through an embodiment of the flowmeter of the present invention.

Referring now to FIG. 2, one form of the flowmeter construction includes an elongated, cylindrically shaped housing 15 which has an internal flow chamber 16. Upper flow orifices 17 and lower flow orifices 18 are circumferentially located about a center axis and are in the walls defining the flow chamber 16. The cross-section of the housing 15 below the flow orifices 18 is necked down at 19 and has an outwardly tapered surface 20 which extends to a threaded socket portion 21. Other tools can be connected below the flowmeter by threaded connection with the socket portion 21. It should be appreciated that this construction provides a sufficient structural cross-section to support other tools below the flowmeter. Also, spacer rods or weights can be used. Impeller type flowmeters typically must be at the lower end of the tool string so they are susceptible to being damaged because of their location. The flowmeter of the present invention can be located at any desired location in a tool string.

A torque impeller 23 with flow blades 24 is disposed in the flow chamber 16. Fluid flow impacts the flow blades 24 and develops a torque about the axis of the torque impeller 23. The impeller 23 is disposed within the flow chamber and the housing provides protection of the impeller from contact with other surfaces. Where the impeller would not contact other surfaces, a housing is not necessary.

The torque impeller 23 is coupled by a torque coupler 25 to a torque shaft 27. The torque shaft 27 extends through an oil filled bore 29 in a connector housing 30 and through an oil filled bore 34 in a housing support 35 and a high pressure connector. The bore 34 in the housing support 35 extends through a central, tubular torsion tube portion 36 in the housing support 35. The torsion tube portion 36 is connected at its upper end to an isolation coupling member 43 to provide a high pressure seal and to connect to a torque force converter 42.

The connector housing 30 connects to a tubular outer housing section 40. In the housing section 40, the torque force transducer 42 is connected by the isolation coupling member 43 to the torque shaft 27 and to the torsion tube portion 36. The housing support 35 in the housing section 40 has a tubular coupling 45 which extends in a bore in the connector housing 30. A conventional locking and sealing ferrule 46 connects the housing support 35 to the connector housing 30 and provides a high pressure metal to metal seal.

The force transducer 42 is electrically coupled to an electronic data measurement assembly 48. Torque forces applied to the force transducer 42 are utilized with dual capacitances in the force transducer for producing electrical measurements as a function of the torque forces. In prior systems, torque forces have been utilized to measure pressure. In the present invention, torque forces measured are a function of the flow velocity of the fluids in the housing chamber 16.

Figure 3:
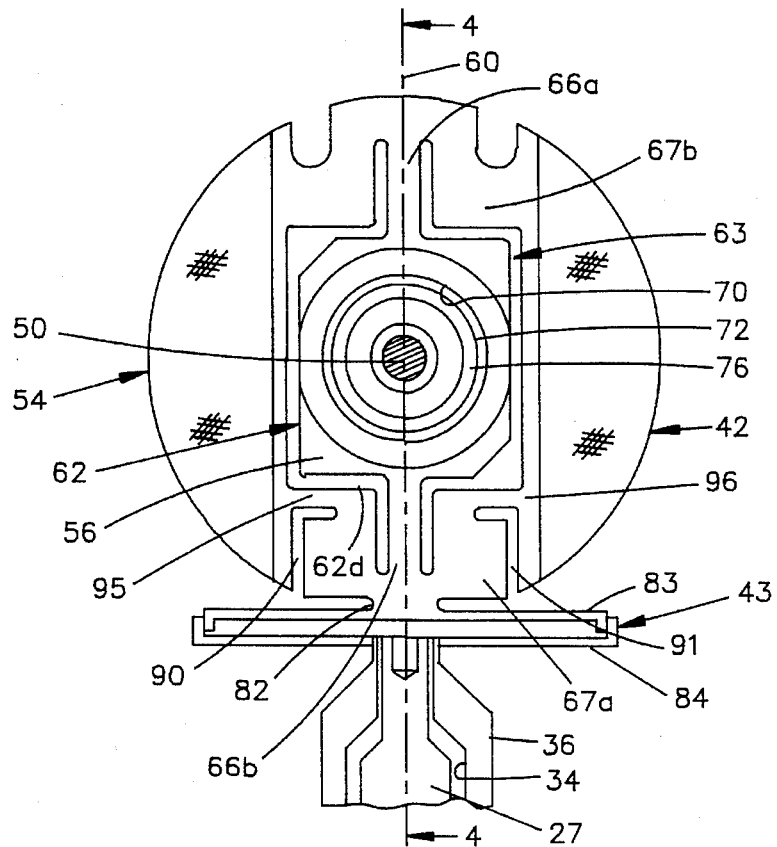
FIG. 3 is a view in cross-section taken along line 3—3 of FIG. 4.
Figure 4:
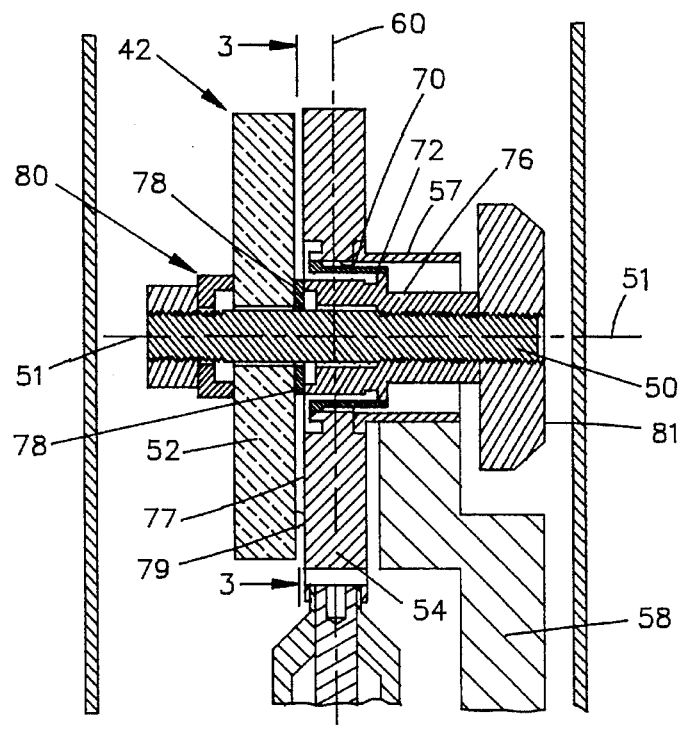
FIG. 4 is a view in cross-section taken along line 4—4 of FIG. 3.
Figure 5:
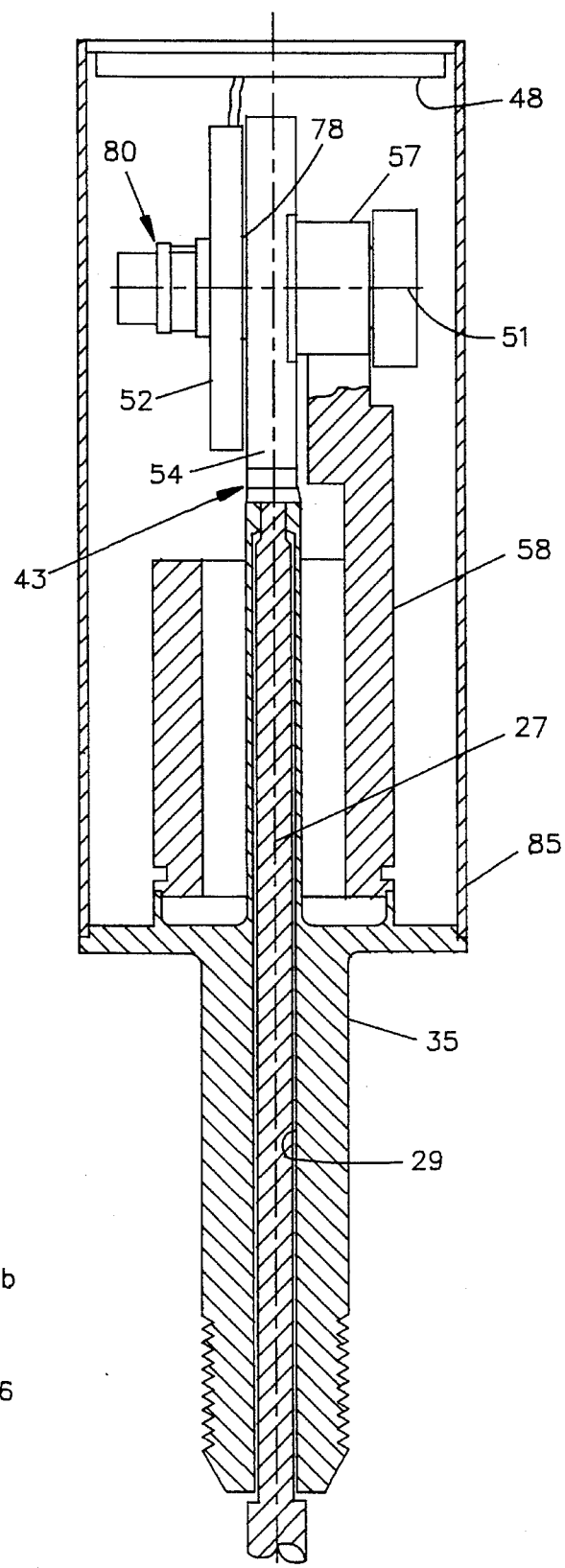
FIG. 5 is an enlarged illustration of the torque force measuring system.

Referring now to FIG. 3, FIG. 4 and FIG. 5, illustration is provided for a suitable force transducer 42 for the present invention. In the illustration, the structure of a force transducer 42 includes an elongated, cylindrically shaped central fastener rod 50 with a central longitudinal axis 51. In FIG. 4, the axis 51 is shown in a horizontal position. The axis 51 is normal to the planes of capacitor plates which are located on a spaced apart first plate base member 52 and second plate base member 54 where the planes would be transverse to the plane of the drawing of FIG. 4. The rod 50 is part of a support means which couples the first plate base member 52 to a fixed center section 56 (see FIG. 3) in the second plate base member 54. The center section 56 is fixed or attached to a vertical support member 58 (see FIG. 4) by a tubular member 57.

The first base member 52 is formed from a cylindrically shaped member and is made of a material having inherently dimensional stable characteristics under changing environmental conditions such as temperature and time aging. Quartz is a suitable material.

As shown in FIG. 3 and FIG. 4, the second capacitor base member 54 is formed from a cylindrically shaped metal plate member and has a first slot configuration of mirror arranged slot systems, 62, 63 which are defined by spaced apart wall surfaces and which are tortuously located in the body of the second base member 54. The first slot configuration provides or defines the central plate section 56 and spaced apart torsion beam members or sections 66a, 66b which connect to outer plate sections 67a, 67b (see FIG. 3). The beam members 66a, 66b are rectangular shaped in transverse cross-section with a narrow dimension in the plane of the drawing (FIG. 3) and a long dimension in a transverse plane (see FIG. 4). The beam members 66a, 66b are adapted to be torqued about a central vertical torque or displacement axis 60 where the torque or displacement axis 60 is located centrally of the beam members 66a, 66b and on a vertical median plane extending through the second base member 54. The displacement axis 60 also intersects and defines a vertical plane with the axis 51. The displacement axis 60 is parallel to the parallel planes in which the capacitor plates are located.

The central section 56 thus is a generally rectangularly shaped member defined between the slots systems 62 and 63 which are symmetrically arranged with respect to a central displacement axis 60. The outer sections 67a, 67b of the second base member 54 are attached by the torsion beam members 66a, 66b to the central section 56 along the central axis 60.

Referring to FIG. 3, in the center of the central section 56 and the base member 54 is a mounting bore 70 which is centered on the axis 51. The bore 70 receives an annular outer tubular support ring 72 (see FIG. 4). The outer support ring 72 is welded about its periphery at its end surface to the central section 56. Disposed within the outer support ring 72 (see FIG. 3 & 4) is an annular inner tubular support member 76 Which is attached to the rod 50.

Referring to FIG. 4, the inwardly facing planar surface 77 of the outer plate sections of the second base member 54 is on the same vertical plane as the upper surface of the center section 56. The facing surface 79 of the first base member 52 is parallel to the surface of the second base member 54. Between the inner support member 76 on the second base member 54 and the first base member 52 is a disc shaped spacer member 78. The spacer member 78 effectively defines the capacitance gap for spaced apart capacitor plates disposed on the surfaces of the base members 52 and 54.

The rod 50 is threadedly attached to the support member 76 and extends through a centrally located opening on the first base member 52. A clamping means 80 threadedly attaches to the rod 50 so that the first and second base members 52 and 54 are assembled in a unitary assembly. A portion of the rod 50 extends outwardly of the support member 76 and is threadedly attached and welded to a balance mass 81. The balance mass 81 overcome gravity effects when the device is in a horizontal position.

The spacer member 78, the rod 50, the clamping means 80, and the support member 76 can be made from a material which is selected to have similar temperature expansion characteristics to the selected material for the first base member 52. A metal material such as Invar or the like is suitable. The second base member 54 is made from a high strength material, such as a maraging stainless steel with good elastic characteristics for the torsion beam members. The steel base member 54 also will provide an electrical ground for the capacitor electrical system.

The first capacitor base member 52, as noted before, is made from a cylindrically shaped member preferably constructed from a quartz or ceramic material and has first and second independent capacitance plate films which are sputtered in separate locations onto a surface 79 of the base member 52. One capacitance plate film is arranged in spacial alignment with the planar surface 77 on the second capacitance base member 54. Connection is made to the edge of the quartz plate. Electrical wire conductors are then connected to each capacitor film plate for separate capacitor measurements. On the surface 77, facing capacitance plate films on an insulator base (see FIG. 4) are provided, if desired, or the metal can be used as a ground surface in a grounded electrical capacitance system.

As shown in FIG. 4, the planar surface on the first base member 52 is arranged normally parallel to the planar surface on the second capacitor base member 54 and is normally separated therefrom by a capacitor spacing distance or gap. The capacitance plate films are off set to either side of the central horizontal axis 51 and are located to either side of the vertical plane through the displacement axis 60. The plate films are parallel to the planar surface on the base member 54. The widths of the capacitor gaps between the respective plate films and the surface 77 is basically defined by the width of the spacer member 78. It can thus be appreciated that the clamping means 80 on the fastener rod 50 attach the first capacitor base member 38 to the inner support ring 76 and, in turn, to the central section 56 of the second capacitor base member 54.

Referring again to FIG. 3, the capacitor base member 54 is also provided with a second vertical wall slot system comprised of angular "L" shaped slots 90 and 91 which are symmetrically arranged with respect to the axis 60. It can be seen that the slots 90 & 91 respectively, define transverse beam portions 95, 96 about an axis perpendicular to the displacement axis 60. The purpose of this arrangement is to minimize temperature effects by providing an equal and accurately controlled heat conduction path to each capacitance side.

The torquing of the beam members 66a, 66b on the central section 56 of the second base member 54 is accomplished by a torque forces about the torque axis 60. The center section 67a on the second base member 54 is attached by a connector portion 82 to the isolation coupling 43. The isolation coupling 43 is constructed to provided an elongated upper beam member 83 with a rectangular cross-section. The upper beam member extends transverse to the axis 60 and is connected to another, lower transverse beam member 84. The lower beam member 84 connects to the upper end of the torque shaft 27 and to the upper end of the torsion tube portion 36. The connection is by welding to provide a high pressure seal with respect to the bore 34. The length of the beam members 83 & 84 is sufficient to permit flexibility and to allow movement relative to the axis 60 between the force transducer and the torque shaft and still maintain high stiffness for torque forces.

The vertical support member 58 (see FIG. 5) is a cut away tubular member which is attached by welding to a cylindrical base section on the housing support 35. A tubular housing 85 encloses the force transducer 42 and the electronics 48 and may be at a vacuum atmosphere.

The torque shaft 27 is supported at its lower end by the torque coupler 25. The torque coupler 25 is arranged to provide a frictionless transfer of torque forces to the torque shaft 27 from the torque impeller while acting as a bearing support member. The torque coupler 25 is arranged to rigidly support the end of the torque shaft against bending and gravity effects while transmitting the torque force on the impeller without friction effects.

Figure 6:
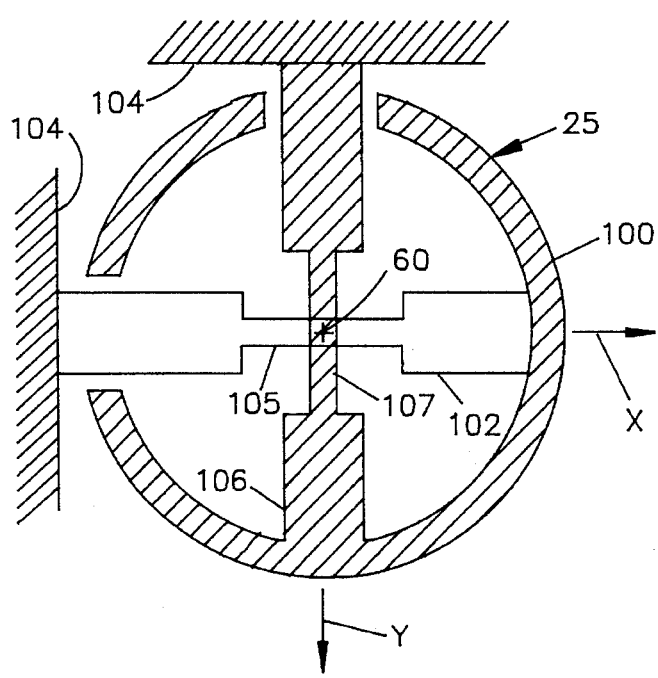
FIG. 6 is a schematic illustration of the principles of the torque coupler.

In FIG. 6, a schematic illustration of the function of the torque coupler 25 is shown in reference to "X" and "Y" axis at right angles in the plane of the drawing and a "Z" axis which is the torque axis 60. The torque impeller 24 is disposed in an X-Y plane with its axis aligned with the "Z" axis. With the torque impeller 24 connected to a tubular body 100 at one location along the "Z" axis (axis 60), torque forces developed about the torque axis 60 are transmitted to the body 100 at the one location. The tubular body 100 connects to one end of a first torsion bar or flexible beam member 102 which has its longitudinal axis disposed along an "X" axis in an X-Z plane. The other end of the torsion support member 102 connects to a fixed body 104. The first torsion support member 102 has a centrally located, necked down section 105 which has a long length along an "X" axis and a long length along a "Z" axis and a narrow width along a "Y" axis.

At another location along the "Z" axis the tubular body 100 connects to one end of a second torsion support member 106 which has its longitudinal axis disposed along a "Y" axis in the Y-Z plane. The other end of the torsion support member 106 connects to the fixed body 104. The second torsion support member has a centrally located, necked down section 107 which has a narrow width along an "X" axis, a long length along a "Z" axis an a long length along a "Y" axis. At another location along the "Z" axis, the body 100 is connected to the torque shaft 27. (Not shown)

The above construction of metal provides a very stiff structure in the X, Y and Z axial directions between the torque impeller and the torque shaft. Torque forces of the impeller are forced to act about the axis 60 ("Z" axis) because of the physical constraints of the construction. The notched sections 105, 107 provide the flexibility to flex about the axis 60 while providing rigidity in the X-Y axis. In short, where the body 100 is torqued about the "Z" axis, it remains aligned with the "Z" axis.

Figure 7:
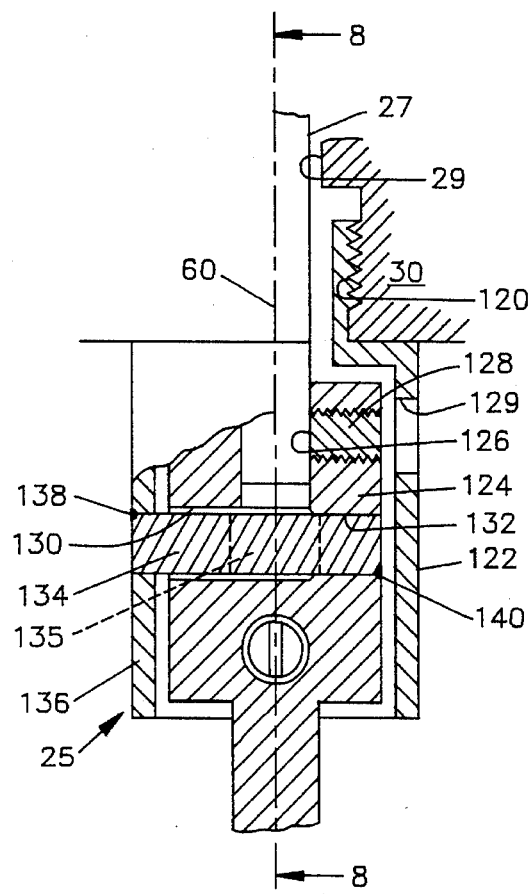
FIG. 7 is a view in cross-section taken along line 7—7 of FIG. 8.
Figure 8:
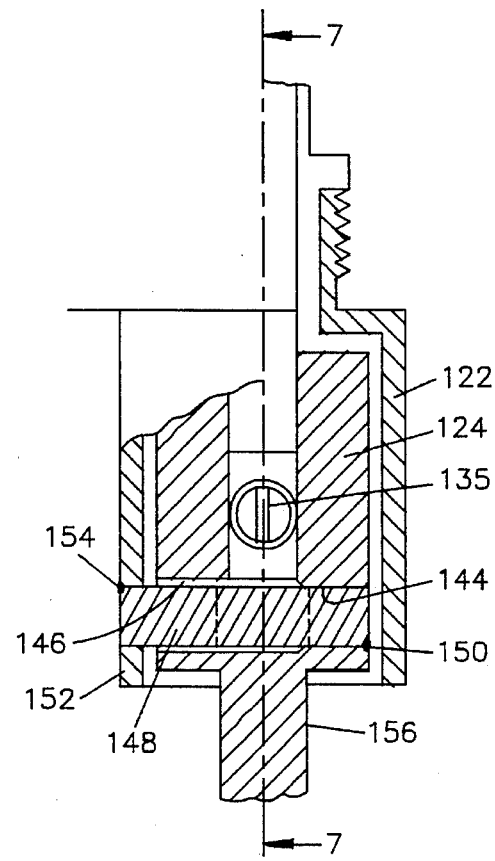
FIG. 8 is a view in cross-section taken along line 8—8 of FIG. 7.

The construction of a torque coupler 25 is shown in FIG. 7 and FIG. 8. The bore 29 in the connector 30 has a enlarged and threaded counterbore 120 which threadedly receives a tubular housing member 122 (The housing member 122 correspond to the fixed portion 104 of FIG. 6). A cylindrically shaped coupling member 124 is disposed in the housing member 122 and has an upper bore 126 along the axis 60 which receives the end of the torque shaft 27 and couples to the shaft 27 by a set screw 128 (The member 124 corresponds to the body 100 of FIG. 6). The screw 128 is inserted through an opening 129 in the housing member 122. The coupling member 124 has a transverse bore 130 which extends through the bore 126 and adjoins a bore 132 with a smaller diameter. A cylindrically shaped metal pin 134 extends into a longitudinally extending slot 136 in the housing member 122 and is welded thereto as shown at 138. (the pin 134 corresponds to the torsion member 102 attached to the fixed body 104 in FIG. 6). The pin 134 is also received in the bore 132 and welded thereto as shown at 140 (this corresponds to the connection to the body member 100 in FIG. 6). The pin 134 has a centrally located, necked down recess 135 with a rectangular cross-section (corresponds to necked down position 105 in FIG. 6)

Below the bore 132, the coupling member 124 has a bore 144 located along an axis transverse to the axis of the bore 132 (see FIG. 8). The bore 144 adjoins an enlarged bore 146 extending across the coupling member. Disposed in the bore 144 is a pin 148. The pin 148 is welded to the coupling member 124 at 150 (corresponds to torsion member 106 attached to body 100 in FIG. 6). The pin 148 extends through a longitudinal slot 152 in the housing member 122 and is welded to the housing member 122 at 154 (corresponds to attachment of torsion member 106 to the fixed body 104 in FIG. 6). The downward extending stub end 156 on the coupling member 124 is used for attachment of a torque impeller to the coupling member 124.

Figure 9:
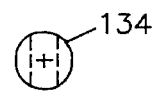
FIG. 9, 10 & 11 are end, side and top views of a torsion bar configuration.
Figure 10:
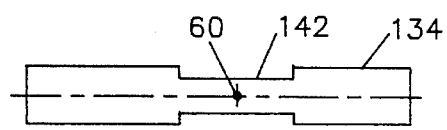
Figure 11:
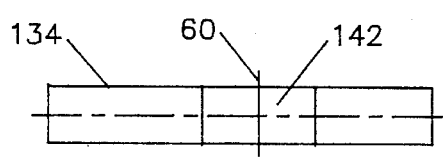

Referring to FIGS. 9, 10 & 11, a typical pin 134 or 144 consists of a cylindrical bar which has flat surfaces cut into both sides to form a necked down section 142 which has a length sufficient to permit a bending about an axis 60 which extends through the long dimension. The pin is resistant to bending in the plane defined by the axis 60 and the axis of the pin.

Typical dimensions for the necked down section on a ⅛ inch diameter pin are 0.007 inches width and 0.150 inches length. This is for a 1 ⅛ inch o.d. well tool where small dimensions are required.

It should be appreciated that the torque coupler 25 provides a rigid support for the torque impeller and the torque shaft but does not impede or distort the torque forces measured. There is basically no moving parts and no threshold of velocity is required to obtain a measurement. In short, the flowmeter has almost instant response characteristics.

Figure 14:
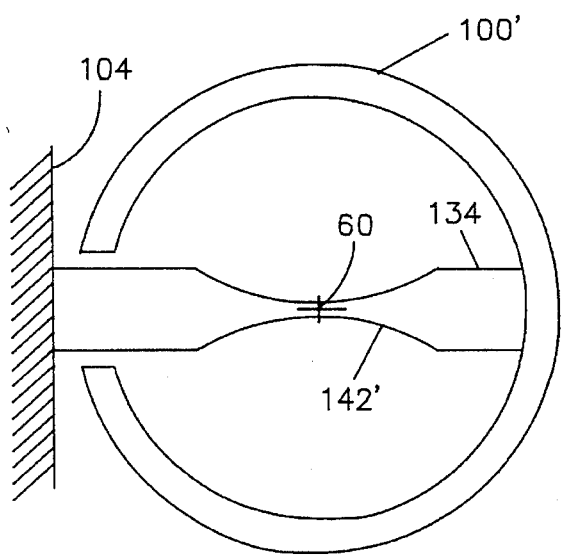
FIG. 14 is a schematic illustration of the principles of the torque coupler with a single beam.
Figure 12:
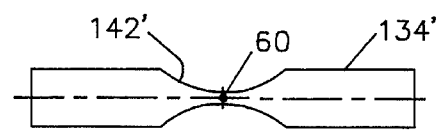
FIG. 12 & 13 are side and top views of another form of the torsion bar configuration.
Figure 13:
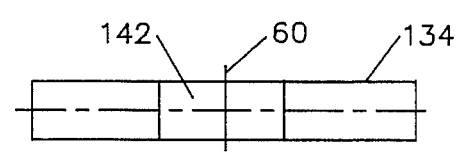

Referring to FIGS. 12, 13 & 14, by design of the notch in a pin, a single pin 134' can be utilized rather than two pins. With a single pin 134' the notch 142' is in the form of curvilinear surfaces which are narrower or closer together at the location of the axis 60. The curved surfaces will force the flexure of the notch 142' about the axis 60 as torque forces are applied to a body member 100'. It will be appreciated that this arrangement can be less accurate than the previously discussed form of torque coupler.

Figure 15:
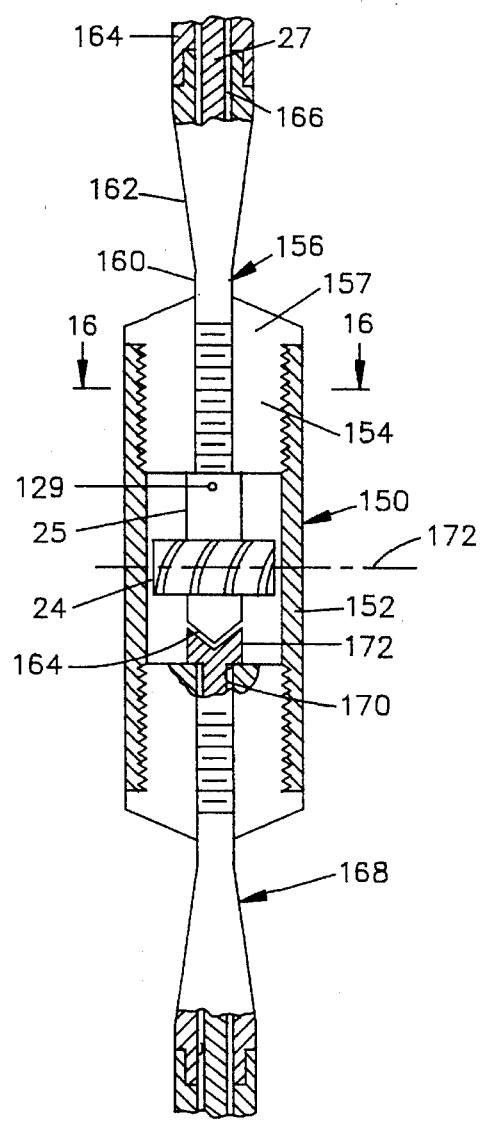
FIG. 15 is a view in cross-section of another form of the flowmeter.
Figure 16:
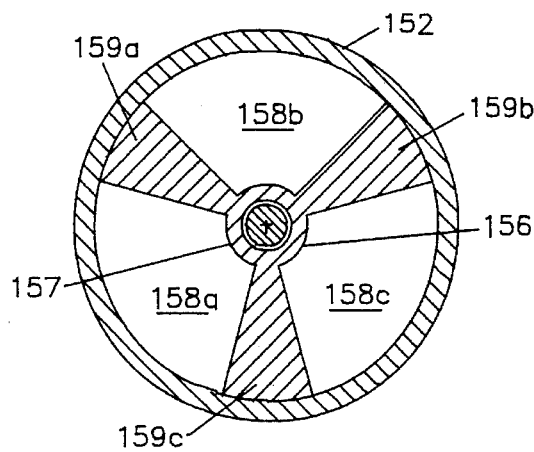
FIG. 16 is a view taken along line 16—16 of FIG. 15.

Referring now to FIGS. 15 and 16, another form of the invention is illustrated. The flowmeter 150 in FIG. 15 includes a tubular housing 152 which defines a flow chamber 154. The tubular housing 152 is internally threaded at both ends. A first flow diverter body 156 includes a triangulated coupling portion 157 formed from an externally threaded portion which has three angularly displaced slots 158 (a–c) (see FIG. 16) extending longitudinally through three sections 159 (a–c) of the coupling portion 157. The coupling portion 157 is reduced to a smaller diameter connecting portion 160 which adjoins an outwardly extending tapered portion 162 which couples to a housing member 164. The diverter body 156 has a central bore 166 to receive the torque shaft 27. In the flow chamber 154, the torque shaft 27 connects to the torque coupler 25. The torque coupler 25, in turn connects to the torque impeller 24. The torque impeller 24 has a stub end with a conical tip 164.

A second flow diverter 168 is constructed similar to the flow diverter 156. A pin 172 with a conical cavity in its end is located adjacent to the tip 164 of the torque impeller 24 and is sized to provide a complimentary configuration below the torque impeller to the configuration above the impeller. It can be appreciated that the construction is basically symmetrical with respect to a horizontal plane 172 normal to the plane of the drawing. Thus, the flowmeter has the same response characteristics irrespective of the direction of flow. The slots 158 (a–c) also act to counteract any tendency of the tool to rotate in response to the torque forces. By acting to straighten the flow swirl caused by the impeller.

Figure 17:
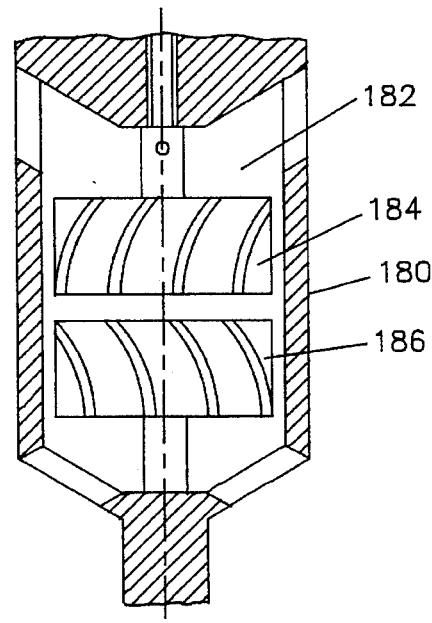
FIG. 17 is a view of still another form of flowmeter configurations.

Referring now to FIG. 17, another form of the invention is illustrated where a housing 180 with a flow chamber 182 contains a torque impeller 184 with the flow vanes in one pitch direction and a stationary impeller 186 with flow vanes in an opposite pitch direction. The effect of flow vanes in opposite pitch directions is to neutralize any tendency of the tool to rotate.

In operation, the well tool including a flowmeter can be sized to pass through a 2" string of tubing and measure flow in the tubing or flow in the well bore below a string of tubing. A centralizer is helpful in assuring that the central flow is always being measured.

The torque impeller is responsive to any torque force and thus no minimum or critical flow velocity is required for operation. This sensitivity also can delete the need for any packer or basket device.

Figure 18:
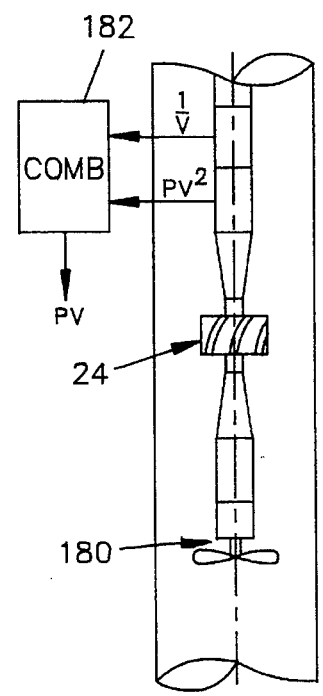
FIG. 18 is a schematic illustration of as combination spinner torque flowmeter for obtaining mass rate.

Referring to FIG. 18, a torque impeller 24 arranged as described herein can be combined with a conventional spinner flowmeter 180 to obtain a mass flow value. In the present invention, a torque measurement developed in response to the fluid flow is proportional to a mass flow rate term multiplied by a fluid velocity term. This relationship, stated broadly is:

$$\text{Torque reading} = \rho V^2 \quad (1)$$

where "ρ" is density and "v" is velocity. The torque reading is convertible to a frequency value.

A proper spinner flowmeter such as a turbine flowmeter can be selected to provide an output frequency measurement which is proportional to fluid velocity, α

$$f \alpha v \quad (2)$$

where "f" is frequency.

The torque reading of the torque flowmeter can be converted to a mass flow measurement by combining the two outputs in a circuit 182 to obtain mass flow (ρv). t,0160

The circuit 182 multiplies the digital representation of torque (developed from capacitance readings) by the reciprocal of the spinner frequency which is the period of the spinner frequency. Thus, the torque indication is corrected for fluid velocity so that is representative of the mass flow.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A flowmeter for use in a flowing stream of fluid, said flowmeter including;

a housing;

torque force measuring means disposed in said housing;

torque shaft coupled to said force measuring means, said torque shaft having a longitudinal torque axis, said torque force measuring means being responsive to torque forces in said torque shaft about said longitudinal torque axis for developing an output response as a function of the torque forces;

a torque flow impeller for developing torque forces in response to fluid flow contacting said flow impeller; and torque coupling means for coupling said torque shaft to said torque flow impeller and for supporting said torque shaft and said flow impeller while transmitting torque forces of said flow impeller to said torque shaft.

2. The apparatus as set forth in claim 1 wherein said torque coupling means includes a coupling member and at least one flexible beam member connecting said flow impeller to said torque shaft where the torsion bar member is connected between said coupling member and a fixed member and is constructed and arranged to constrain the torque forces to act about the torque axis, said torsion bar member being normal to said torque axis and extending through said torque axis.

3. The apparatus as set forth in claim 2 wherein said flexible beam member has a central necked down section with long length and depth dimensions in a plane disposed in a first plane through which the torque axis extends and a short width dimension in a second plane normal to said first plane.

4. The apparatus as set forth in claim 3 wherein there are two flexible beam members which are disposed at a 90° relationship to one another.

5. The apparatus as set forth in claim 3 wherein said short width dimension is defined between two complimentarily arranged curved surfaces.

6. The apparatus as set forth in claim 2 wherein said torque coupling means includes a cylindrically shaped member with a center bore along a central bore axis for receiving and attaching to an end of said torque shaft and with a transverse bore with a central transverse axis intersecting said central bore axis, and a tubular outer member; and where said flexible beam member is connected at one end to said transverse bore and is connected at an opposite end to said tubular outer member.

7. The apparatus as set forth in claim 1 wherein said housing has a tubular portion extending to an end opening and said torque shaft is disposed in said tubular portion in a non-contact context except for a connection to said end opening whereby said torque shaft and said tubular portion can be subject to torque forces.

8. The apparatus as set forth in claim 7 wherein said connection provides a pressure seal.

9. The apparatus as set forth in claim 7 wherein, said connection is coupled to said torque force measuring means by an isolation means which is constructed and arranged to permit relative axial motion between said torque force measuring means and said connection.

10. The apparatus as set forth in claim 9 wherein said isolation means includes elongated beam members disposed transversely to the torque axis.

11. A flowmeter for use in a flowing steam of fluid, said flowmeter including;

a housing;

a flow chamber in said housing said flow chamber having an inlet flow port and an outlet flow port, and at least one of said flow ports having flow straightening vanes;

torque force measuring means disposed in said housing;

torque shaft coupled to said force measuring means, said torque shaft having a longitudinal torque axis, said torque force measuring means being responsive to torque forces in said torque shaft about said longitudinal torque axis for developing an output response as a function of the forces;

a torque flow impeller for developing torque forces in response to fluid flow contacting said flow impeller; and torque coupling means for coupling said torque shaft to said torque flow impeller and for supporting said torque shaft and said flow impeller while transmitting torque forces of said flow impeller to said torque shaft.

12. The flowmeter as set forth in claim 11 wherein the housing is cylindrical and is configured with respect to the inlet flow port with a reduced diameter portion to facilitate entry of a liquid flow.

13. The flowmeter as set forth in claim 11 wherein said flow chamber is defined by a tubular member and at least one of said flow ports is defined by a body member having longitudinal extending recesses which are circumferentially displaced.

14. The flowmeter as set forth in claim 13 wherein the flow ports are symmetrically arranged about a transverse plane to the torque axis.

15. The flowmeter as set forth in claim 11 and further including a second torque flow impeller for developing torque forces in response to fluid flow contacting said second flow impeller, said second torque flow impeller being attached to said housing.

16. A flowmeter system for use in a flowing stream of fluid, said flowmeter including;

a first flowmeter including a housing;

a torque force measuring means disposed in said housing for developing a torque reading parameter;

torque shaft coupled to said force measuring means, said torque shaft having a longitudinal torque axis, said torque force measuring means being responsive to torque forces in said torque shaft about said longitudinal torque axis for developing an output response as a function of the forces;

a torque flow impeller for developing torque forces in response to fluid flow contacting said flow impeller;

torque coupling means for coupling said torque shaft to said torque flow impeller and for supporting said torque shaft and said flow impeller while transmitting torque forces of said flow impeller to said torque shaft;

a second flowmeter including a spinner and means for developing fluid velocity parameter of a flowing stream of fluid;

and means for combining said fluid velocity parameter and said torque reading parameter for developing an indication of mass flow.

17. A method for measuring fluid flow in a flowing stream of fluid including the steps of:

disposing a flowmeter in a flowing stream of fluid where said flowmeter has a torque shaft coupled at one end to a torque force measuring means and coupled at its other end to a torque flow impeller and where said torque force measuring means is responsive to torque forces in said torque shaft about a longitudinal torque axis for developing an output response as a function of the torque forces where the torque forces are developed in response to fluid flow contacting said torque flow impeller and where there are torque coupling means for coupling said torque shaft to said torque flow impeller and for rigidly supporting said torque shaft and said flow impeller while transmitting torque forces of said flow impeller to said torque shaft;

detecting the torque forces produced on said torque shaft by said stream of fluid; and converting said detected torque forces into flow measurement parameters.

18. A method for determining the mass flow of a flowing stream of fluid in a well bore comprising the steps of:

lowering a well tool into a well bore to a location for a measurement of fluid flow where said well tool has torque force measuring means and a flow velocity means disposed in a tool housing and the torque force measuring means includes a stationary torque shaft and a torque flow impeller for developing torque forces in the torque shaft in response to fluid flow contacting said flow impeller and torque coupling means for coupling said torque shaft to said torque flow impeller and for supporting said torque shaft and said flow impeller while transmitting torque forces of said flow impeller to said torque shaft and where the flow velocity means includes a rotating impeller;

developing a first frequency signal term from the torque forces caused by the fluid on the torque impeller as a function of the density of the fluid and the squared value of velocity from said fluid flow;

developing a second output frequency term from said fluid flow as a function of flow velocity caused by the flowing stream of fluid on the rotating impeller where the output frequency term is proportional to the velocity term of the flowing stream; and combining said first and second frequency terms for deriving a mass flow rate consisting of the density and the velocity of the fluid flow.

19. Apparatus for determining the mass flow of a flowing stream of fluid including:

a tool having torque means with a stationary torque impeller attached to a non-rotating torque-shaft for developing a torque force data parameter torque forces developed in the torque shaft where the torque force data parameter is proportional to a mass flow rate term multiplied by a velocity term;

means for rigidly supporting said torque shaft relative to a support housing in said tool for preventing rotation but permitting torque forces to be developed in said torque shaft;

spinner means in said tool for developing velocity data parameters from said flowing stream of fluid as a function of velocity caused by the flowing stream;

means for rotatively supporting said spinner means, said spinner means having a spinner impeller for developing an output frequency term as a function of the rotation of said spinner impeller where the output frequency term is proportional to the velocity term of the flowing stream; and means for combining said first and second data parameters for deriving a mass flow rate of the flowing stream of fluid.

* * * * *